United States Patent [19]

Tomita

[11] Patent Number: 4,558,440
[45] Date of Patent: Dec. 10, 1985

[54] SYSTEM FOR RECORDING PATTERNS OF MAGNETICALLY RECORDED INFORMATION BY UTILIZING THE MAGNETO-OPTIC EFFECT

[75] Inventor: Yasuo Tomita, Yokohama, Japan

[73] Assignee: Canon Kabushiki Kaisha, Tokyo, Japan

[21] Appl. No.: 522,719

[22] Filed: Aug. 12, 1983

[30] Foreign Application Priority Data

Aug. 19, 1982 [JP] Japan ............................... 57-143836
Aug. 19, 1982 [JP] Japan ............................... 57-143838

[51] Int. Cl.$^4$ .......................... G11B 5/32; G11B 11/10
[52] U.S. Cl. ..................................... 369/13; 369/110; 360/114; 360/59
[58] Field of Search ................. 360/114, 59; 369/110, 369/100, 13, 14, 15; 365/122

[56] References Cited

U.S. PATENT DOCUMENTS 3,969,573  7/1976  Bouwhuis et al. ................. 369/110
4,409,631  10/1983 Matsumoto ......................... 360/114

FOREIGN PATENT DOCUMENTS 57-44241  3/1982  Japan .
0056238   4/1983  Japan ................................... 369/46

OTHER PUBLICATIONS

NHK Laboratories Note 285, Feb. 1983.
Chen et al., MnBi Films: Curie Point Writing, 1970, J. of Applied Physics, vol. 41, No. 6, 1970, pp. 2530–2534.

Primary Examiner—Raymond F. Cardillo, Jr.
Assistant Examiner—Alyssa H. Bowler
Attorney, Agent, or Firm—Fitzpatrick, Cella, Harper & Scinto

[57] ABSTRACT

A device for reading magnetically recorded patterns on a magnetic recording medium includes a first system for causing a light beam polarized in a predetermined direction to enter the recording medium, a second device for relatively varying the ratio of the polarized component in the predetermined direction and the polarized component in a direction perpendicular thereto, of the light of said light beam reflected or transmitted by the recording medium, and a third device including a photodetector and an amplifier for amplifying a detection signal, the third device being for detecting the light beam from the second means and reading the recorded patterns on the magnetic recording medium, the second device being set so that the SN ratio of the detection signal becomes maximum.

13 Claims, 14 Drawing Figures

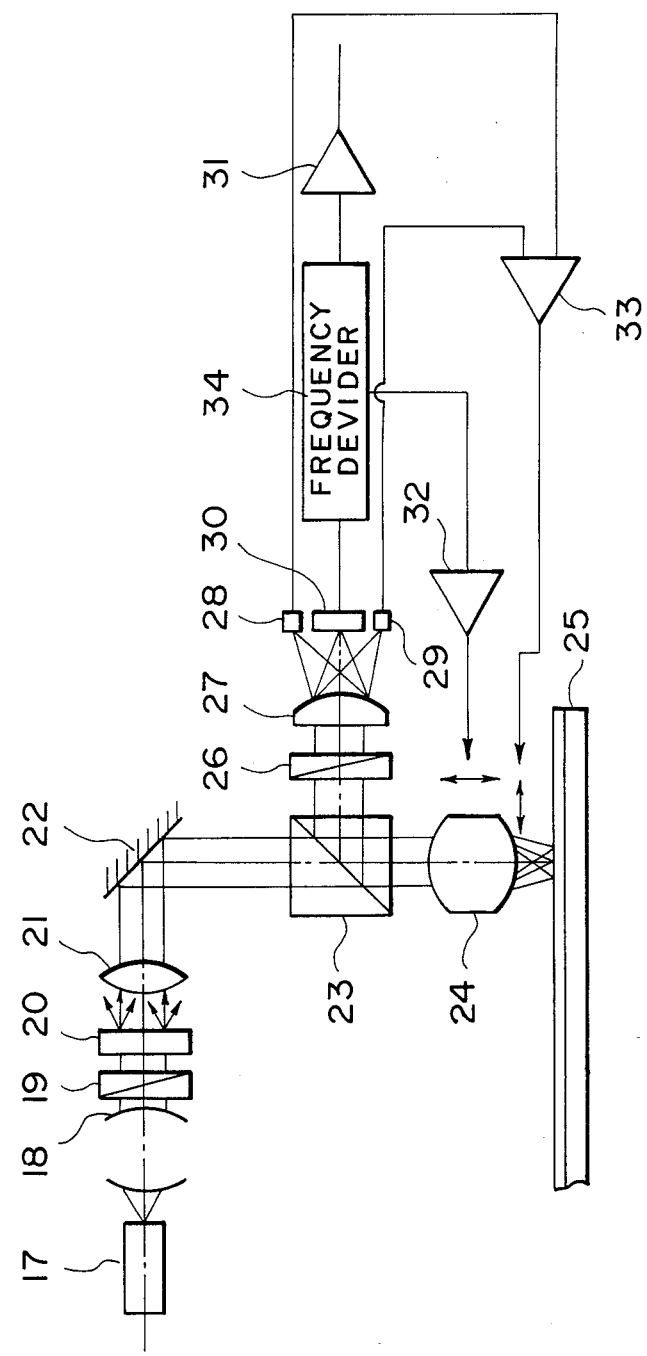
F I G. 9

SYSTEM FOR RECORDING PATTERNS OF MAGNETICALLY RECORDED INFORMATION BY UTILIZING THE MAGNETO-OPTIC EFFECT

BACKGROUND OF THE INVENTION

1. Field of the Invention

This invention relates to a system for reading the recorded patterns of magnetically recorded information, which utilizes the magneto-optic effect.

2. Description of the Prior Art

The method of optically reading magnetically recorded information by the use of the magneto-optic Kerr effect is known, and particularly the method of reading recorded patterns which uses the polar Kerr effect from a vertical magnetic recording member has been widely used. An optical system as shown in FIG. 1A of the accompanying drawings is used for the electrical detection of such recorded patterns.

In FIG. 1A, reference numeral 2 designates a polarizing plate, reference numeral 3 denotes a half mirror, reference numeral 4 designates an objective lens, reference numeral 5 denotes a vertical magnetic recording member, reference numeral 6 designates an analyzer, reference numeral 7 denotes an eyepiece lens, and reference numeral 8 designates a photoelectric detector.

A light beam 1 becomes a light beam linearly polarized in a predetermined direction by the polarizing plate 2, and enters the vertical magnetic recording member 5. The half mirror used in the conventional system is of a transmission factor and reflection factor of approximately 50% independently of the direction of polarization. The plane of polarization of the light beam is subjected to rotations in opposite directions by the Kerr effect corresponding to the direction of magnetization (upward or downward) of the vertical magnetic recording member 5 and is reflected. For example, if the plane of polarization of the light beam reflected by a downwardly magnetized portion is subjected to rotation of $\theta K$, the plane of polarization of the light beam reflected by an upwardly magnetized portion is subjected to rotation of $-\theta K$.

Where the incident light beam is P-polarized as shown in FIG. 1B of the accompanying drawings, and if the direction of polarized-light transmission of the analyzer 6 is disposed in a perpendicular direction (Q-direction) with respect to the direction of polarization $-\theta K$, the reflected light from the upwardly magnetized portion is intercepted by the analyzer 6, and the component $\Delta$ of the reflected light from the downwardly magnetized portion transmitted through the analyzer 6 passes through the analyzer 6. By this phenomenon, vertically magnetized patterns can be detected.

However, the vertical magnetic recording member known heretofore is generally small in Kerr rotation angle $\theta k$ and a sufficient SN ratio cannot be obtained therefrom. Therefore, for example, a proposition as disclosed in U.S. patent application Ser. No. 382,202 has been made. In this proposition, a polarizing beam splitter is used instead of the half mirror of FIG. 1A and of the light beam reflected by the vertical magnetic recording member 5, as compared with the polarized component in said predetermined direction (the P-polarized component in the example of FIG. 1B), the polarized component in a direction perpendicular thereto (the S-polarized component of FIG. 1B) is increased to thereby apparently increase the Kerr rotation angle and enhance the SN ratio. Therefore, the characteristic of the polarizing beam splitter used in the aforementioned proposition is set so as to maximize the modulated component by the magneto-optic Kerr effect.

However, the SN ratio is varied under the influence of the noise in the photoelectric detector depending on the reflection factor of the magnetic recording medium or the construction of the photoelectric detector and, even if the characteristic of the polarizing beam splitter is set as shown in the aforementioned proposition, a maximum SN ratio cannot always be obtained.

SUMMARY OF THE INVENTION

It is an object of the present invention to provide a system for reading recorded patterns in which a maximum SN ratio can be obtained with the noise of photodetector means taken into account.

The present invention achieves the above object with a system for reading magnetically recorded patterns on a magnetic recording medium, the system including first means for causing a light beam polarized in a predetermined direction to enter the recording medium, second means for varying the ratio of the polarized component in the predetermined direction and the polarized component in a direction perpendicular to the predetermined direction, of the light of the light beam reflected or transmitted by the recording medium, and third means including a photodetector and an amplifier for amplifying the detection signal of the photodetector, said third means detecting the light beam from the second means and reading the recorded patterns on the magnetic recording medium, and in which the second means is set so that the SN ratio of the detection signal is maximum.

The invention will become fully apparent from the following detailed description thereof taken in conjunction with the accompanying drawings.

BRIEF DESCRIPTION OF THE DRAWINGS

FIG. 9 is a schematic diagram showing an example in which the present invention is applied to a disc memory of the photo-magnetic recording type.

DESCRIPTION OF THE PREFERRED EMBODIMENTS

Figure 1B:
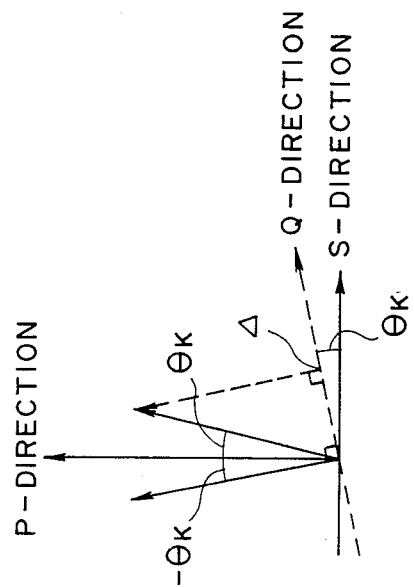
FIGS. 1A and 1B illustrate the manner of detection of vertical magnetically recorded patterns according to the prior art.
Figure 1A:
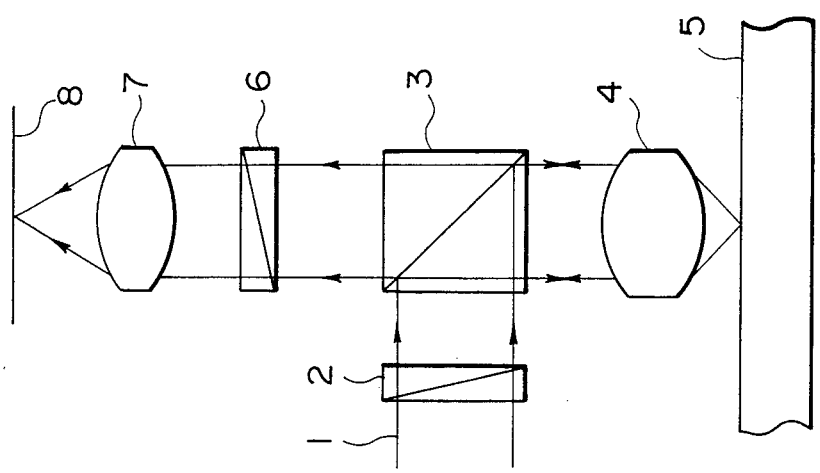
Figure 2:
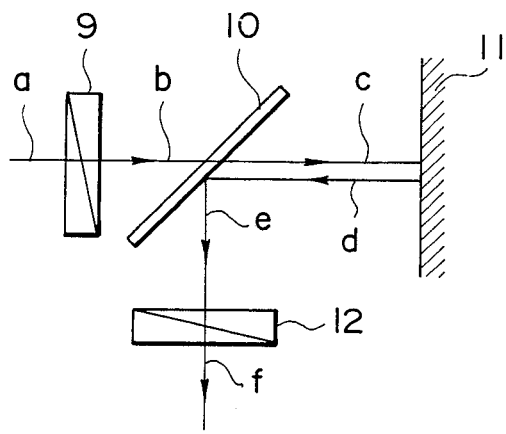
FIG. 2 is a schematic view showing the optical system of an embodiment of the present invention.

FIG. 2 shows the optical system of an embodiment of the present invention. Here, consider a case where the direction of polarization of an incident light beam a is made into a P-polarized condition parallel to the plane of the drawing sheet by a polarizer 9. An optical element 10 used in the present embodiment, unlike a conventional half mirror having no polarizing characteristic, has a nature that transmittance t and reflectance r differ depending on the direction of polarization. That is, where the amplitude transmittance of the optical element 10 for P-polarized component is $t_p$ and the amplitude reflectance of the optical element 10 for P-polarized component is $r_p$ and the amplitude transmittance of the optical element 10 for S-polarized component (in FIG. 2, a polarized component perpendicular to the plane of the drawing sheet) is $t_s$ and the amplitude reflectance of the optical element 10 for S-polarized component is $r_s$, the optical element 10 generally is a half mirror having the characteristics that $|t_p| \neq |t_s|$ and $|r_p| \neq |r_s|$.

The polarizing characteristics of the optical element 10, vertical magnetic recording medium 11 and analyzer 12 in FIG. 2 may be expressed as follows by the well-known Jones matrix. The transmission Jones matrix $T$ of the optical element 10 and the reflection Jones matrix $R$ of the optical element 10 are:

$$T = \begin{bmatrix} t_p & 0 \\ 0 & t_s \end{bmatrix}, \quad R = \begin{bmatrix} r_p & 0 \\ 0 & r_s \end{bmatrix} \tag{1}$$

As regards the vertical magnetic recording medium 11, if the medium amplitude reflectance during perpendicular incidence is R and the Kerr rotation amplitude reflectance by the magneto-optic Kerr effect is K, the medium Jones matrix $M$ is expressed as $$M = \begin{bmatrix} -R & K \\ K & R \end{bmatrix} \tag{2}$$

Figure 3:
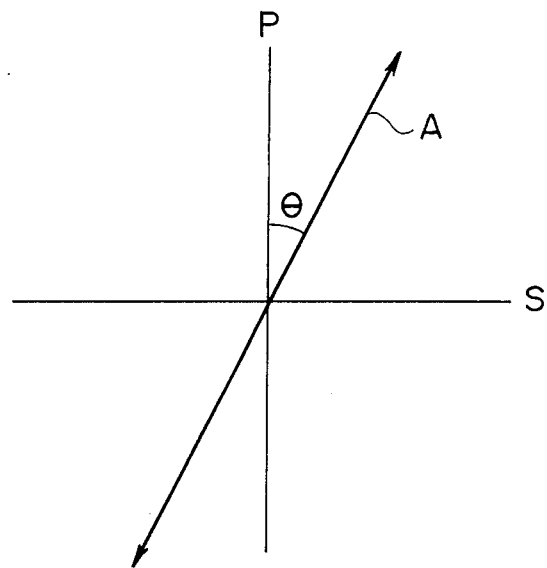
FIG. 3 shows the azimuth of the transmission axis of an analyzer.

As regards the analyzer 12, if the extinction factor is $\eta$ when the transmission axis A of the analyzer is inclined by an angle $\theta$ in the direction of S-polarization relative to the direction of P-polarization as shown in FIG. 3, the transmission Jones matrix $A$ is:

$$A = \begin{bmatrix} \cos\theta & -\sin\theta \\ \sin\theta & \cos\theta \end{bmatrix} \begin{bmatrix} 1 & 0 \\ 0 & \eta \end{bmatrix} \begin{bmatrix} \cos\theta & \sin\theta \\ -\sin\theta & \cos\theta \end{bmatrix} \tag{3}$$

$$= \begin{bmatrix} \cos^2\theta + \sqrt{\eta}\sin^2\theta & \frac{1}{2}(1-\sqrt{\eta})\sin 2\theta \\ \frac{1}{2}(1-\sqrt{\eta})\sin 2\theta & \sin^2\theta + \sqrt{\eta}\cos^2\theta \end{bmatrix}$$

Accordingly, if, in FIG. 2, the Jones vector representing the polarized condition of the detected light f transmitted through the analyzer 12 is $D$, where the Jones vector of a light beam b is $E$, $D$ may be expressed as $$D = A\, R\, M\, T\, E \tag{4}$$

Where the light beam b is a linearly polarized light in the P-direction of polarization as previously described and if the amplitude thereof is Vo, the intensity I of the detected light f transmitted through the analyzer 12 is expressed as follows by the use of equations (1), (2), (3) and (4):

$$I \approx |V_o|^2 |t_p|^2 [|R|^2 |r_p|^2 (\cos^2\theta + \eta \sin^2\theta) - |R||K||r_p||r_s|(1-\eta)\cos\delta \sin 2\theta] \tag{5}$$

where $R = |R|e^{i\alpha}$, $K = |K|e^{i\beta}$, $r_p = |r_p|e^{i\gamma_p}$, $r_s = |r_s|e^{i\gamma_s}$, $\delta = \alpha - \beta + \gamma_p - \gamma_s$ and the term $|K|^2$ has been omitted as a secondary minute amount.

The first term of the right side of formula (5) above is the DC component of the detected light and shows the intensity $I_R$ of the nonmodulated component light of the incident light beam, i.e., the component of the incident light beam in the direction of polarization. The second term is the AC component by the vertical magnetic recording medium 11 and means the intensity $I_K$ of the Kerr rotation modulated component light, i.e., the component of the incident light beam which is perpendicular to the direction of polarization.

From formula (5), $I_K$ is maximum when the azimuth $\theta$ of the analyzer 12 is 45°. Also, the extinction factor $\eta$ of the analyzer 12 generally is $\eta \leq 10^{-2}$ and, for $\theta \approx 45°$, the influence of the incompleteness of extinction of the analyzer 12 is 1% or less relative to both $I_R$ and $I_K$.

Now, where $\theta = 45°$ and assuming that the absorption of the optical element 10 is negligible, $|t_p|^2 = 1 - |r_p|^2$ and from formula (5), $$I_R \approx \frac{1}{2}|V_o|^2|R|^2|r_p|^2(1-|r_p|^2) \tag{6}$$

$$I_K \approx |V_o|^2|R||K||r_p||r_s|(1-|r_p|^2)\cos\delta \tag{7}$$

Figure 4:
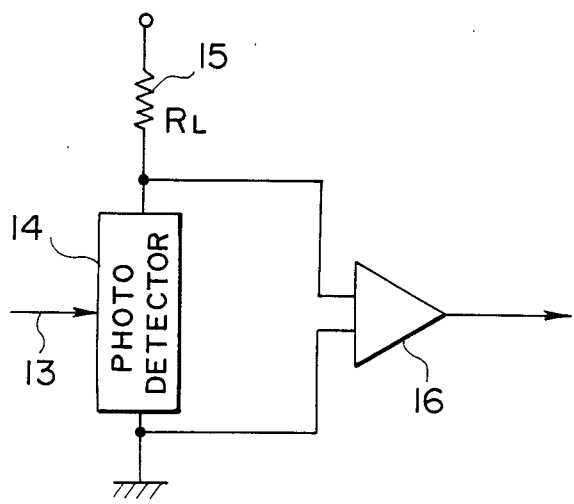
FIG. 4 shows an example of the photoelectric detecting system used in the present invention.

The light passed through the analyzer of FIG. 2, like the detected light 13 of FIG. 4, is photoelectrically detected by a photodetector 14 and converted into a photocurrent, whereafter the modulated component is read out as an electrical signal voltage-amplified by an amplifier 16 including a load resistor 15. Considering that the noise source in the signal reading is chiefly the shot noise by a light-receiving element and the heat noise by the amplifier, if the photodetector 14 is one having no multiplication function such as Si-pin photodiode, the SN ratio S can be expressed in decibel indication as follows:

$$S = 10\log_{10}\left\{ \frac{e^2\epsilon^2}{2h^2\nu^2}I_K^2 \bigg/ \left( \frac{e^2\epsilon^2}{h^2\nu^2}\Delta I_R^2 + \frac{2e^2\epsilon}{h\nu}I_R + \frac{4kT_e}{R_L} \right)\Delta B \right\} \tag{8}$$

where $I_R$ is the intensity of the non-modulated component light, $\Delta I_R^2$ is its mean square intensity fluctuation ("mean of square intensity" minus "square value of mean intensity"), $I_K$ is the intensity of the Kerr modulated component, e is the amount of charge, h is the plank's constant, k is the Boltzmann's constant, $\epsilon$ is the quantum efficiency of the photodetector 14, $R_L$ is the resistance value of the load resistor 15, Te is the equivalent noise temperature, $\Delta B$ is the band width of the detected signal, and $\nu$ is the frequency of the light beam.

The optical element 10 in the present embodiment has such amplitude transmittances $t_p$, $t_s$ and amplitude reflectances $r_p$, $r_s$ which maximize the value of S of equation (8). Accordingly, the present embodiment maximizes the SN ratio in the reading of recorded patterns by the optical element as described above being provided in the optical path of the light beam modulated in accordance with the recorded patterns.

In the aforedescribed embodiment, the reflection and transmission characteristics of the optical element 10 are set so as to maximize the S of equation (8), but in practice, S should desirably be 15 dB or more. Also, if, in equation (8), the mean square intensity fluctuation $\Delta I_R^2$ of the non-modulated component light $I_R$ resulting from the coarseness or non-uniformity of the surface of the recording medium or the fluction of the intensity of the laser light source is negligible, then the SN ratio S' may be $$S' = 10 \log_{10} \left\{ \frac{e^2 \epsilon^2}{2h^2 \nu^2} I_K^2 / \left( \frac{2e^2 \epsilon}{h\nu} I_R + \frac{4kTe}{R_L} \right) \Delta B \right\} \quad (8)'$$

and an optical element having such a characteristic which maximizes the value of S' may be used in the present embodiment.

Figure 5:
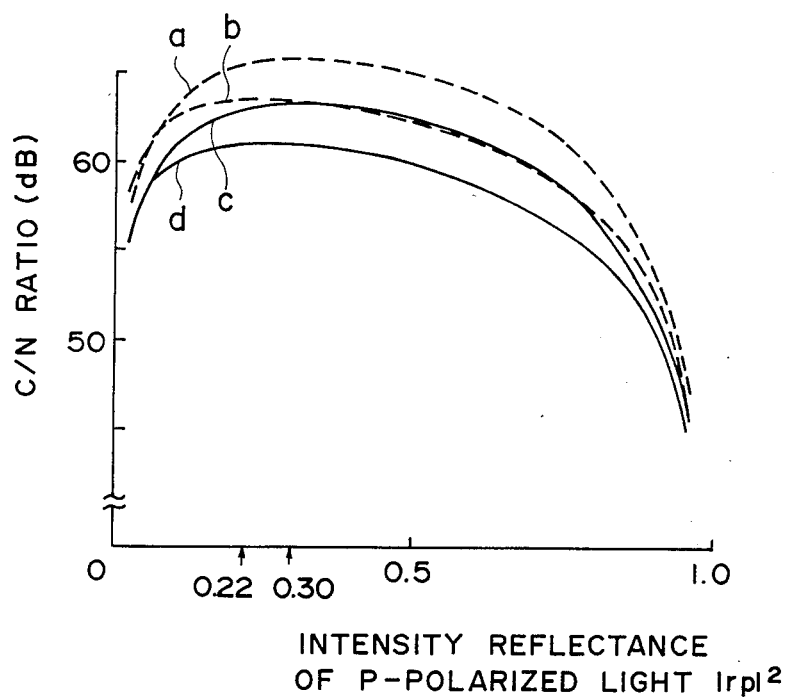
FIG. 5 shows an example of the relation between the C/N ratio of a detection signal using a photodetector having no multiplication function and the polarizing characteristic of the optical element of FIG. 2.

FIG. 5 shows the dependence of the SN ratio calculated from equation (8)' upon $|r_p|^2$ and $|r_s|^2$ when a semiconductor laser (wavelength $\lambda = 850$ nm) is used as the light source. In FIG. 5, $\epsilon = 0.9$, Te = 1200° K., $\Delta B = 3 \times 10^4$ Hz, $R_L = 10^4 \Omega$ and $|Vo|^2 = 10^{-4}$ w and the cases where $|R|^2 = 0.57$ and $\theta k = 0.7°$ with MnBi being used as the recording medium and with the two sets of values exemplarily shown in a known literature (K. Egashira et al., J. Appl. Phys. 45, 3643 (1974)) being substituted into equation (8)' are shown by curves b and d and the cases where $|R|^2 = 0.10$ and $\theta k = 3.6°$ are shown by curves a and c. The curves a and b indicated by broken lines show the case where the intensity reflectance $|r_s|^2$ of the optical element 10 of FIG. 2 for S-polarized component is $|r_s|^2 = 0.9$, and the curve c and d depicted by solid lines shows the case where $|r_s|^2 = 0.5$. The ordinate of FIG. 5 represents the SN ratio for the center frequency of the detection signal as the C/N ratio, and the phase difference $\gamma_p - \gamma_s$ between orthogonal components is an integer multiple of $\pi$.

As can be seen from FIG. 5, the curves in which $|r_s|^2$ is greater for the values of the two sets of $|R|^2$ and $\theta k$ are higher in C/N ratio. Also, as regards $|r_p|^2$, there exists an optimum value which maximizes the C/N ratio for particular $|R|^2$ and $\theta k$. The optimum value differs depending on the values of $|R|^2$ and $\theta k$, but in the ranges of $0.02 < |R|^2 < 0.96$ and $0.1° < \theta k < 4.0°$, there exists an optimum value which maximizes the C/N ratio in the range of 0.2–0.35 for $|r_p|^2$. Accordingly, as compared with a case where use is made, for example, of a conventional half mirror having no polarizing characteristic in which $|r_p|^2 = |r_s|^2 = 0.5$, the C/N ratio will be increased by about 3 dB if, on the basis of the present embodiment, the intensity reflectance of S-polarized light $|r_s|^2$ of the optical element 10 in FIG. 2 is $|r_s|^2 = 0.95$ and the intensity reflectance of P-polarized light $|r_p|^2$ of the optical element 10 is a value which maximizes the C/N ratio.

The optical element used in the above-described embodiment, like a polarizing beam splitter having an intensity reflectance of 20–35% for the direction of polarization of the incident light beam and an intensity reflectance of about 100% for the direction of polarization orthogonal thereto, can be made by a well-known method.

In the foregoing example, a photodetector having no multiplication function has been employed, but where use is made of a photodetector having a multiplication function such as an Si-avalanche photodiode (APD), the SN ratio S can be expressed in decibel units as follows:

$$S = 10 \log_{10} \left\{ \frac{e^2 \epsilon^2}{2h^2 \nu^2} G^2 I_K^2 / \left( \frac{2e^2 \epsilon}{h\nu} G^{2+x} I_R + \frac{4kTe}{R_L} \right) \Delta B \right\} \quad (9)$$

where G is the multiplication factor of the photodetector, x is a multiplication noise parameter representing the inherent shot noise resulting from the multiplication of the photodetector, and the other symbols are similar to those in equation (8). The multiplication noise parameter is determined by the photodetector used and for example, in Si-APD, $x = 0.3 \leq x \leq 0.4$.

The optical element 10 in the present embodiment has such amplitude transmittances $t_p$, $t_s$ and amplitude reflectances $r_p$, $r_s$ which maximize the value indicated by S of equation (9) from the aforementioned formulas (6) and (7).

Further, in the case as previously described, $x \neq 0$ and therefore, there exists a quantity $G_{opt}$, the value thereof being as follows as the result of equation (9) having been partially differentiated with respect to G:

$$G_{opt} = \{4C_3 / xC_2 |Vo|^2 (1 - |r_p|^2) |r_p|^2 |R|^2\}^{1/(x-2)} \quad (10)$$

where $C_1 = e^2 \epsilon^2 / 2h^2 \nu^2$, $C_2 = 2e^2 \epsilon / h\nu$ and $C_3 = 4kTe/R_L$. By substituting this $G_{opt}$ and formulas (6) and (7) into equation (9), the SN ratio S' at the optimum multiplication factor $G_{opt}$ becomes:

$$S' = 10 \log_{10} \left[ \frac{C_1 |Vo|^4 x (1 - |r_p|^2)^2 |r_p|^2 |r_s|^2 |K|^2 \cos^2 \delta}{(2+x)C_3} \cdot \left( \frac{2C_3 |R| x}{xC_2 |Vo|^2 (1 - |r_p|^2) |r_p|^2} \right)^{\frac{2}{x+2}} \right] \quad (11)$$

Further, by partially differentiating equation (11) with respect to $|r_p|^2$, the intensity reflectance of P-polarized light $|r_p|^2$ of the optical element 10 which maximizes S' of equation (11) is given by $$|r_p|^2 = x/(2+3x) \quad (12).$$

This result can be primarily determined for the reading system because it does not depend on R and K, i.e., magnetic film parameters, of the vertical magnetic recording medium 11. As previously described, $x = 0.3 \leq x \leq 0.4$ in Si-APD and $x \approx 1$ in Ge-APD and therefore, by setting optimum $|r_p|$ from equation (12) in the range of 0.1–0.2 depending on the type of the light-receiving element used, reading of the maximum SN ratio becomes possible. In this case, the multiplication factor of the photodetector need be adjusted to the optimum multiplication factor $G_{opt}$ expressed by equation (10). Further, it is desirable that the multiplication factor of the photodetector be adjustable in accordance with the variation in optimum multiplication factor resulting from replacement or the like of the magnetic recording medium. Thus, even if the magnetic recording medium is changed, the maximum SN ratio can always be obtained without varying the optical system.

Figure 6:
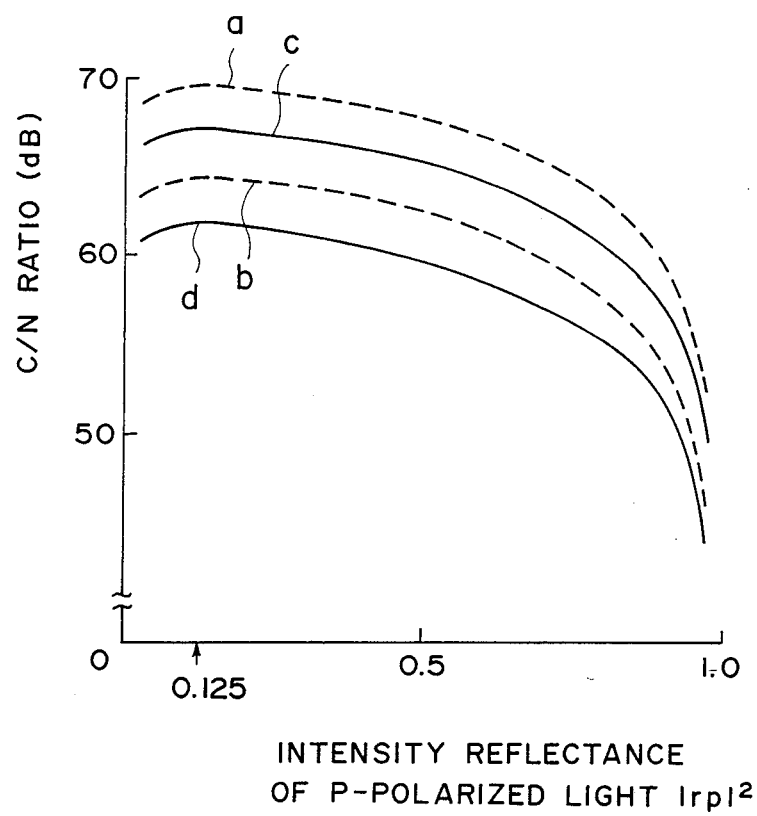
FIG. 6 shows an example of the relation between the C/N ratio of a detection signal using a photodetector having the multiplication function and the polarizing characteristic of the optical element of FIG. 2.

FIG. 6 shows the dependence on $|r_p|^2$ and $|r_s|^2$ of the SN ratio calculated by the use of equation (11) when the light source is a semiconductor laser (wavelength $\lambda = 850$ nm) and the multiplication factor of the detector is adjusted to the optimum multiplication factor $G_{opt}$. In FIG. 6, $\epsilon = 0.9$, $Te = 1200°$ k., $x = 0.4$, $B = 3 \times 10^4$ Hz, $R_L = 10^4 \Omega$ and $|Vo|^2 = 10^{-4}$ w and the cases where $|R|^2 = 0.57$ and $\theta k = 0.7°$ with MnBi being used as the recording medium and with the two sets of values exemplarily shown in the aforementioned literature of K. Egashira et al. being substituted into equation (11) are shown by curves b and d and the cases where $|R|^2 = 0.10$ and $\theta k = 3.6°$ are shown by curves a and c. The curves a and b indicated by broken lines show the case where the intensity reflectance $|r_s|^2$ of the optical element 10 of FIG. 2 for S-polarized light component is $|r_s|^2 = 0.9$, and the curves c and d depicted by solid lines show the case where $|r_s|^2 = 0.5$. The ordinate of FIG. 6 represent the SN ratio for the center frequency of the detection signal as C/N ratio, and the phase difference $\gamma_p - \gamma_s$ between orthogonal components is an integer multiple of $\pi$.

As can be seen from FIG. 6, the reflectance $|r_p|^2$ of P-polarized light when $x = 0.4$ in equation (12) is $|r_p|^2 = 0.125$ and the C/N ratio is maximum, and such optimum reflectance does not depend on magnetic film parameters $|R|^2$ and $\theta k$. It can also be seen that as $|r_s|^2$ is greater, higher C/N ratio can be achieved. Thus, as compared with a case where use is made of a conventional half mirror having no polarizing characteristic in which $|r_p|^2 = |r_s|^2 = 0.5$, the C/N ratio is increased by about 5 dB when, on the basis of the present embodiment, the intensity reflectance $|r_s|^2$ of S-polarized light of the optical element in FIG. 2 is $|r_s|^2 = 0.9$ and the intensity reflectance of P-polarized light $|r_p|^2$ is the value obtained by substituting the multiplication noise index x inherent to the photodetector into equation (12) and the multiplication factor of the photodetector adjusted to the optimum multiplication factor given by equation (10).

The optical element used in the above-described embodiment, like a polarizing beam splitter having an intensity reflectance of 10-20% for the direction of polarization of the incident light beam and a high intensity reflectance of about 100% for the direction of polarization orthogonal thereto, can be made by a well-known method.

Figure 7A:
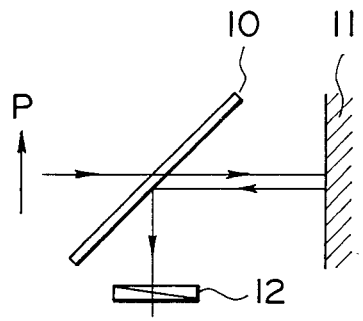
FIGS. 7A, 7B, 7C, 7D, 8A and 8B show the optical systems of further embodiments of the present invention.

The above-described embodiments are for the system shown in FIG. 7A. Next, the optimum conditions of the characteristics of respective optical elements 10 will be sought after with respect to further embodiments of the recorded pattern reading system using the optical element 10.

Figure 7B:
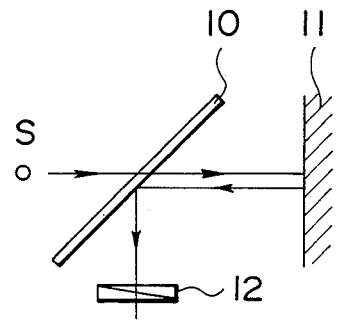

A case where a light beam enters the optical element 10 in S-polarized condition as shown in FIG. 7B will first be considered. The quantity of light passed through the analyzer 12 is obtained as follows through entirely the same process as in the case of FIG. 7A:

$$I_R \approx \tfrac{1}{2}|Vo|^2|R|^2|r_s|^2(1-|r_s|^2) \tag{13}$$

$$I_K \approx |Vo|^2|R||K||r_p||r_s|(1-|r_p|^2)\cos\delta \tag{14}$$

If, in formulas (6) and (7), $r_p$ is substituted for by $r_s$ and $r_s$ is substituted for by $r_p$, these two formulas will be entirely coincident with each other. Where use is made of a photodetector having no multiplication function, intensity reflectances $|r_s|^2$ and $|r_p|^2$ which will provide $I_R$ and $I_K$ which will maximize S of equation (8) or S' of equation (8)' may be found from formulas (13) and (14) and an optical element 10 having such intensity reflectances may be used, whereby a recorded pattern reading system of high SN ratio can be realized as in the previously described embodiments. In the present embodiment, by making $|r_p|^2$ as great as possible and making $|r_s|^2$ into an optimum value in the range of 20-35%, a maximum SN ratio can be obtained.

Where use is made of a photodetector having a multiplication function, use can be made of an optical element 10 having such a characteristic which maximizes S of equation (9) from formulas (13) and (14). Also, by making $|r_s|^2$ into a value obtained by substituting x inherent to the photodetector into $$|r_s|^2 = x/(2+3x) \tag{15}$$

and making the multiplication factor of the photodetector into an optimum multiplication factor given as $r_p$ and $r_s$ of equation (10), a maximum SN ratio can be obtained.

The case of FIG. 7A or 7B is a case where the light beam is transmitted through the optical element, again enters the optical element 10 from the recording medium 11 and is reflected thereby and made into a detected light by the analyzer 12.

In the converse case, that is, in a case where the light beam is reflected by the optical element 10 and further reflected by the recording medium 11 and thereafter transmitted through the optical element 10, the Jones vector D expressed by equation (4) in the previous example is $$D = A \; T \; M \; R \; E \tag{16}$$

Figure 7C:
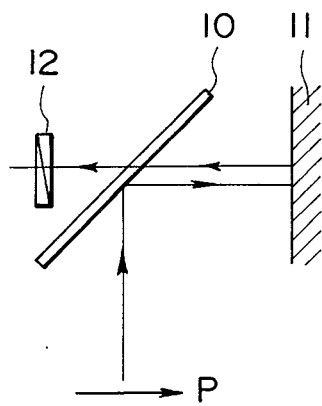
Figure 7D:
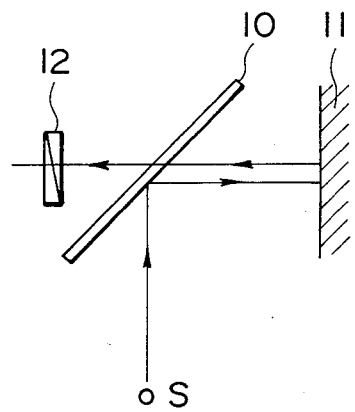

Accordingly, where the light beam enters the optical element in P-polarized condition as shown in FIG. 7C, by substituting $t_p$ for $r_p$ and $t_s$ for $r_s$ in formulas (6) and (7), there can be obtained:

$$I_R \approx \tfrac{1}{2}|Vo|^2|R|^2|t_p|^2(1-|t_p|^2) \tag{17}$$

$$I_K \approx |Vo|^2|R||K||t_p||t_s|(1-|t_p|^2)\cos\delta \tag{18}$$

and where use is made of a photodetector having no multiplication function, by increasing $|t_s|^2$ from equation (8) or (8)' and making $|t_p|^2$ into an optimum value in the range of 20-35%, a maximum SN ratio can be obtained in the recorded pattern detection.

Where use is made of a photodetector having a multiplication function, use can be made of an optical element 10 having intensity transmittances of polarized light $|t_s|^2$ and $|t_p|^2$ which maximize S of equation (8) from equations (15) and (16). Also, by making $|t_p|^2$ of the optical element 10 into a value obtained by substituting x inherent to the photodetector into $$|t_p|^2 = x/(2+3x) \tag{19}$$

and adjusting the multiplication factor of the photodetector to the optimum multiplication factor $G_{opt}$ expressed by $$G_{opt} = \{4C_3/xC_2|Vo|^2(1-|t_p|^2)|t_p|^2|R|^2\}^{1/(x+2)} \tag{20}$$

where $C_2 = 2e^2\epsilon/h\nu$ and $C_3 = 4kTe/R_L$, there can be obtained a maximum SN ratio.

Where the light beam enters the optical element 10 in S-polarized condition as shown in FIG. 7D, the intensity of light passed through the analyzer 12 can entirely likewise be represented by $$I_R = \frac{1}{2}|V_0|^2|R|^2|t_s|^2(1-|t_s|^2) \quad (21)$$

$$I_K = |V_0|^2|R||K||t_s||t_p|(1-|t_s|^2)\cos\delta \quad (22).$$

If $r_p$ is substituted for by $t_s$ and $r_s$ is substituted for by $t_p$ in formulas (6) and (7), these formulas will be coincident with formulas (21) and (22), and when use is made of a photodetector having no multiplication function, $|t_p|^2$ may be increased from equation (8) or (8)' and $|t_p|^2$ may be made into an optimum value in the range of 20–35%, whereby recorded patterns can be detected at a maximum SN ratio.

Where use is made of a photodetector having a multiplication function, use can be made of an optical element 10 having such $|t_p|^2$ which maximizes equation (9) from formulas (21) and (22). Also, by increasing $|t_p|^2$, making $|t_s|^2$ into a value obtained from the multiplication noise index x of the photodetector in accordance with $$|t_s|^2 = x/(2+3x) \quad (23)$$

and adjusting the multiplication factor of the photodetector to the optimum multiplication factor $G_{opt}$ given with $t_p$ of equation (20) as $t_s$, there can be obtained a maximum SN ratio.

Figure 8A:
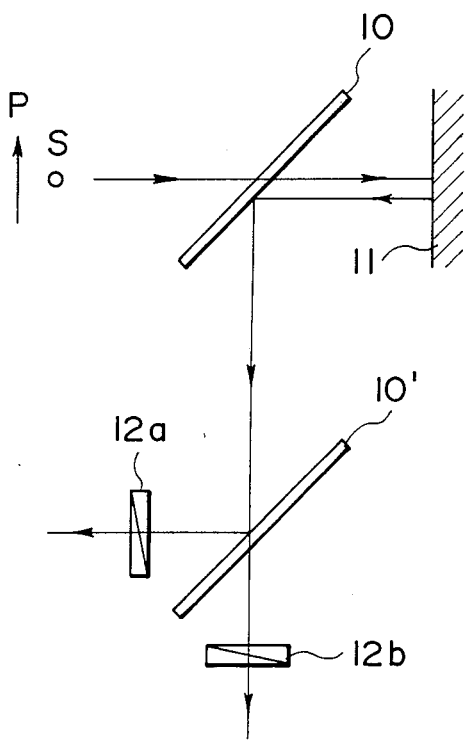
Figure 8B:
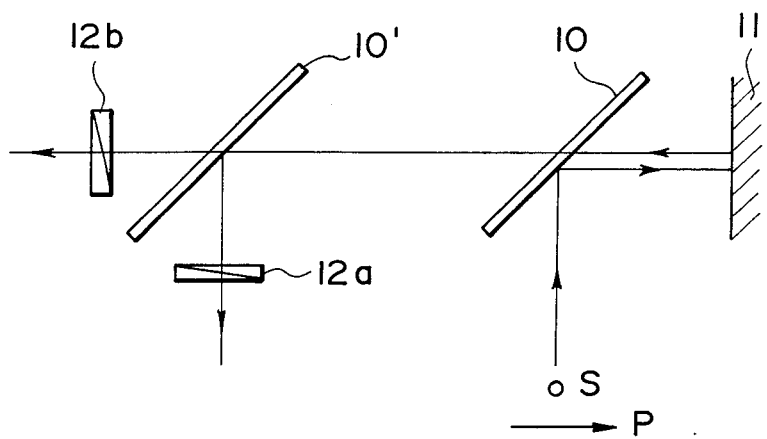

Again in a case where the detected light from the optical element 10 is further divided by an optical element (8)' as shown in FIGS. 8A and 8B, the foregoing discussion can apply. In the case of FIG. 8A, as regards the intensities of light obtained as $$Da = A\ a\ R'\ R\ M\ T\ E \quad (24)$$

$$Db = A\ b\ T'\ R\ M\ T\ E \quad (25)$$

when the light beam enters the optical element 10 in P-polarized condition, $r_p$, $r_s$ and $\theta$ in formulas (6) and (7) are substituted for by $r_p r_p'$, $r_s r_s'$ and $\theta a$, respectively, with regard to the detected light from the analyzer 12a and $r_p$, $r_s$ and $\theta$ are substituted for by $r_p t_p'$, $r_s t_s'$ and $\theta b$, respectively, with regard to the detected light from the analyzer 12b, and as in the aforedescribed embodiment, a recorded pattern reading system can be constructed by optical elements 10 and 10' having reflection and transmission characteristics which can provide a maximum SN ratio.

For the detected light divided at this time, the transmission axis directions $\theta a$ and $\theta b$ of the optical element 10 and analyzers 12a, 12b are suitably selected, whereby the relative values of the intensity of each non-modulated light component and the intensity of the Kerr rotation modulated light component can be varied. Generally, in the arrangement as shown in FIG. 8A, it is usual that the light beams divided by the optical element 10' are received by respective photodetectors and subjected to electrical differential detection. In this case, it is desirable that $\theta a = -\theta b$ and further, the divided light beams be equal to each other in the relative values of the intensity of the non-modulated light component and the intensity of the Kerr rotation modulated component. Accordingly, in the case of such electrical differential detection, a half mirror having the characteristics of $|r_s'| = |t_s'|$ and $|r_p'| = |t_p'|$ and having no polarizing characteristic should preferably be used as the optical element 10'. Of course, however, a half mirror having a polarizing characteristic may also be used with the incompleteness of differential by the detection processing system taken into account. Again in the case of the incidence of S-polarized light, $r_p'$, $r_s'$, $t_p'$ and $t_s'$ may be substituted for by $r_s'$, $r_p'$, $t_s'$ and $t_p'$, respectively, and just the same discussion can apply.

FIG. 8B shows a case where the detected light is divided by the optical element 10' in an optical system similar to that of FIGS. 7C and 7D. In this case, for the incidence of P-polarized light, in formulas (6) and (7), $t_p$, $t_s$ and $\theta$ may be substituted for by $t_p t_p'$, $t_s t_s'$ and $\theta a$, respectively, with regard to the light passed through the analyzer 12a and $t_p$, $t_s$ and $\theta$ may be substituted for by $t_p r_p'$, $t_s r_s'$ and $\theta b$, respectively, with regard to the light passed through the analyzer 12b, and just the same discussion as that made in connection with FIG. 8A can apply. Again in the case of the incidence of S-polarized light, $t_p'$, $t_s'$, $r_p'$ and $r_s'$ can be substituted for by $t_s'$, $t_p'$, $r_s'$ and $r_p'$, respectively.

Even in the cases of FIGS. 8A and 8B, recorded pattern reading of high SN ratio can be accomplished by setting an intensity reflectance and intensity transmittance dependent on the directions of polarization of the optical elements 10 and 10' so as to maximize the SN ratio of the detection signal.

An embodiment in which the recorded pattern reading system of the present invention is applied to a disc memory of the photomagnetic recording type will now be described with reference to FIG. 9.

In FIG. 9, reference numeral 17 designates a light source such as a semiconductor laser or an He-Ne laser. Reference numeral 18 denotes a collimating optical system for making the light beam from the light source into a parallel light beam. Designated by 19 is a polarizing plate having the axis thereof disposed so that the incidence plane of polarization is P-polarized light relative to the optical element 23 described in the previous embodiment. Reference numeral 20 denotes a phase diffraction grating which effects light beam angle separation for forming a sub-spot for tracking detection on a vertical magnetic recording member 25 by an objective lens 24. A lens 21 has the function of imaging the diffraction grating 20 near the pupil plane of the objective lens 24, thereby preventing the interception of the angle-separated light beam in the system up to the objective lens 24. Denoted by 22 is a mirror for bending the optical axis by 90° and directing the light beam to the objective lens 24. The optical element 23 is disposed at the position of the conventionally used half mirror to thereby constitute a recorded pattern reading system like the aforedescribed embodiment. The light beam forms spots on the rotating vertical magnetic recording member 25 by the object lens 24. There are three spots, i.e., two spots for tracking signal detection and one spot for RF signal detection formed by the angle separating function of the diffraction grating 20.

The light beam subjected to Kerr rotation and reflected by the vertical magnetic recording member is separated from the incident light beam by the optical element 23 and separation of the polarized components is effected by an analyzer 26. Reference numeral 27 designates an optical system having astigmatism. This optical system is necessary for detecting an automatic focusing signal for controlling the focusing state of the objective lens chiefly by a four-division light-receiving element 30.

The electrical signal obtained as a result of the four-division light-receiving element receiving light is separated into an automatic focusing signal and an RF signal at a suitable frequency band by a frequency divider 34. The RF signal is amplified by an amplifier 31, whereafter the automatic focusing signal supplied to a signal demodulating system is sent to a driver 32 and the focused state of the objective lens is controlled in accordance with this signal.

On the other hand, the light beams separated by the optical system 27 are detected by photodetectors 28 and 29 and the detection signals are differentiated by a differentiator 33, whereafter the horizontal direction of the objective lens is controlled via the driver and tracking is effected.

As described in connection with the previous embodiment, where the light-receiving element 30 has multiplication function, it is desirable that this amplification factor be made adjustable in conformity with the magnetic recording medium.

Reproduction of a file memory using a vertical magnetic recording member can be accomplished by the above-described construction.

The present invention is not restricted to the above-described embodiments, but various modifications may be made therein. For example, the aforedescribed embodiment has been shown as an example in which the Kerr effect is used to detect the reflected light, but the present invention is also usable in a reading system for detecting the modulated light transmitted through the recording medium. The photoelectric detecting system is neither restricted to the construction of FIG. 4. Any photodiode such as Ge-photodiode or the like may be used as the photodetector.

What I claim is:

1. A system for reading patterns of magnetically recorded information by utilizing the magneto-optic effect, comprising:
    first means for causing a light beam polarized in a predetermined direction to be incident on a magnetic recording medium, on which information is magnetically recorded, to be at least one of reflected by and transmitted through said magnetic recording medium;
    second means for increasing a polarization component in a direction perpendicular to said predetermined direction, relative to the polarization component in said predetermined direction, of the light beam which is one of reflected by and transmitted through said recording medium, such that the polarization direction of the light beam which is one of reflected by and transmitted through said recording medium is rotated through a predetermined angle in accordance with said information, whereby said predetermined angle is larger than angle of rotation of the polarization direction of light which is one of reflected by and transmitted through said recording medium in the absence of said increasing by said second means; and
    third means including a photodetector for producing a detection signal and having no multiplication function and an amplifier for amplifying the detection signal, said third means detecting the polarization direction of the light beam from said second means, producing the detection signal representative thereof, and reading the recorded pattern on said magnetic recording medium;
    said second means being set so that S shown in the following equation becomes maximum:

$$S = 10 \log_{10}\left\{ \frac{e^2\epsilon^2}{2h^2v^2} I_K^2 / \left( \frac{e^2\epsilon^2}{h^2v^2} \Delta I_R^2 + \frac{2e^2\epsilon}{hv} I_R + \frac{4kTe}{R_L} \right) \Delta B \right\}$$

where $I_R$ is the intensity of the polarized component in said predetermined direction of the light beam from said second means, $I_K$ is the intensity of the polarized component in the direction perpendicular thereto of said light beam, $\Delta I_R^2$ is the mean square intensity fluctuation of $I_R$, e is the amount of charge, h is the Plank's constant, k is the Boltzmann's constant, $\epsilon$ is the quantum efficiency of said photodetector, $R_L$ is the load resistance of said photodetector, Te is the equivalent noise temperature, $\Delta B$ is the band width of the detection signal, and $v$ is the frequency of the light beam.

2. A system according to claim 1, wherein said light beam incident on said magnetic recording medium is reflected therefrom, and wherein said second means is an optical element having different transmittances and reflectances depending on the direction of polarization, said second means separating the light beam incident on said magnetic recording medium from said first means and the light beam reflected from said magnetic recording medium.

3. A system for reading patterns of magnetically recorded information by utilizing the magneto-optic effect, comprising:
    first means for causing a light beam polarized in a predetermined direction to be incident on a magnetic recording medium, on which information is magnetically recorded to be at least one of reflected by and transmitted through said magnetic recording medium;
    second means for increasing a polarization component in a direction perpendicular to said predetermined direction, relative to the polarization component in said predetermined direction, of the light beam which is one of reflected by and transmitted through said recording medium, such that the polarization direction of the light beam which is one of reflected by and transmitted through said recording medium is rotated through a predetermined angle in accordance with said information, whereby said predetermined angle is larger than angle of rotation of the polarization direction of light which is one of reflected by and transmitted through said recording medium in the absence of said increasing by said second means; and
    third means including a photodetector for producing a detection signal and having a multiplication function and an amplifier for amplifying the detection signal, said third means detecting the light beam from said second means, producing the detection signal representative thereof, and reading the recorded pattern on the magnetic recording medium;
    said second means being set so that S shown in the following equation becomes maximum:

$$S = 10 \log_{10}\left\{ \frac{e^2\epsilon^2}{2h^2v^2} G^2 I_K^2 / \left( \frac{2e^2}{hv} G^2 + \right.\right.$$

-continued $$xI_R + \frac{4kTe}{R_L}\right) \Delta B \right\},$$

where $I_R$ is the intensity of the polarized component in said predetermined direction of the light beam from said second means, $I_K$ is the intensity of the polarized component in the direction perpendicular thereto of said light beam, G is the multiplication factor of said photodetector, x is the multiplication noise index of said photodetector, e is the amount of charge, h is the Plank's constant, k is the Boltzmann's constant, $\epsilon$ is the quantum efficiency of said photodetector, $R_L$ is the load resistance of said photodetector, Te is the equivalent noise temperature, $\Delta B$ is the band width of the detection signal, and $\nu$ is the frequency of the light beam.

4. A system according to claim 3, wherein said light beam incident on said magnetic recording medium is reflected thereby, and wherein said second means is an optical element having different transmittances and reflectances depending on the direction of polarization, said second means separating the light beam incident on said magnetic recording medium from said first means and the beam reflected from said magnetic recording medium.

5. A system according to claim 4, wherein when intensity transmittance of said optical element for the light beam in said predetermined direction of polarization is $|t_i|^2$, $|t_i|^2$ is in the relation of $$|t_i|^2 = x/(2+3x)$$

with said multiplication noise index x, and the multiplication factor G of said photodetector for detecting the light beam transmitted through said optical element is an optimum multiplication factor $G_{opt}$ expressed by the following equation:

$$G_{opt} = \left\{ 4.4kTe/R_L x \frac{2e^2\epsilon}{h\nu} |V_0|^2(1 - |t_i|^2)|t_i|^2|R|^2 \right\}^{1/(x+2)},$$

where Vo represents the amplitude of the light beam entering said magnetic recording medium.

6. A system according to claim 4, wherein when the intensity reflectance of said optical element for the light beam in said predetermined direction of polarization is $|r_i|^2$, $|r_i|^2$ is in the relation of $$|r_i|^2 = x/(2+3x)$$

with said multiplication noise index x, and the multiplication factor G of said photodetector for detecting the light beam reflected from said optical element is an optimum multiplication factor $G_{opt}$ expressed by the following equation:

$$G_{opt} = \left\{ 4.4kTe/R_L x \frac{2e^2\epsilon}{h\nu} |V_0|^2(1 - |r_i|^2)|r_i|^2|R|^2 \right\}^{1/(x+2)},$$

where Vo represents the amplitude of the light beam entering said magnetic recording medium.

7. A system according to claim 5 or 6, wherein the multiplication factor G of said photodetector is adjustable in accordance with the variation in the optimum multiplication factor.

8. A system according to claim 1 or 3, wherein said third means includes an analyzer installed so that the transmission axis azimuth thereof is at an angle of about 45° with respect to said predetermined direction of polarization.

9. A system for reading patterns of magnetically recorded information by utilizing the magneto-optic effect, comprising:
   means for causing a light beam polarized in a predetermined direction to be incident on a magnetic recording medium, on which information is magnetically recorded, to be at least one of reflected by and transmitted through said magnetic recording medium;
   a polarizing beam splitter, the light beam which is at least one of reflected by and transmitted through said recording medium having the polarization direction thereof rotated through a predetermined angle in accordance with said information on said magnetic recording medium and being incident on said polarizing beam splitter;
   an analyzer for converting the predetermined angle through which the polarization direction of said light beam is rotated in accordance with said information to a change of light intensity of said light beam, the light beam from said polarizing beam splitter being passed through said analyzer;
   a photodetector having a multiplication function, said photodetector detecting the light beam passed through said analyzer; and
   means for adjusting the multiplication factor of said photodetector.

10. A system according to claim 9, wherein said photodetector detects the light beam passed through said polarizing beam splitter and said adjusting means adjusts the multiplication factor G of said photodetector so that G satisfies the following equation:

$$G = \left\{ 4.4kTe/R_L X \frac{2e^2\epsilon}{h\nu} |V_0|^2(1 - |t_i|^2)|t_i|^2|R|^2 \right\}^{1/(X+2)}$$

where k is the Boltzmann's constant, Te is the equivalent noise temperature, $R_L$ is the load resistance of said photodetector, e is the amount of charge, $\epsilon$ is the quantum efficiency of said photodetector, h is the Plank's constant, $\nu$ is the frequency of the light beam, $V_0$ is the amplitude of the light beam incident on the recording medium, X is the multiplication noise index of the photodetector, R is the amplitude reflectance of said recording medium and $|t_i|^2$ is the intensity transmittance of the polarizing beam splitter for the light beam in said predetermined direction of polarization.

11. A system according to claim 10, wherein the intensity transmittance $|t_i|^2$ and the multiplication noise index X are in the relation of $$|t_i|^2 = X/(2+3X).$$

12. A system according to claim 9, wherein said photodetector detects the light beam reflected by said polarizing beam splitter and said adjusting means adjusts the multiplication factor G of said photodetector so that G satisfies the following equation:

$$G = \left\{ 4.4kTe/R_L X \frac{2e^2\epsilon}{h\nu} |V_0|^2 (1 - |r_i|^2)|r_i|^2|R|^2 \right\}^{1/(X+2)}$$

where k is the Boltzmann's constant, Te is the equivalent noise temperature, $R_L$ is the load resistance of the photodetector, e is the amount of charge, $\epsilon$ is the quantum efficiency of the photodetector, h is the Plank's constant, $\nu$ is the frequency of the light beam, $V_0$ is the amplitude of the light beam incident on the recording medium, X is the multiplication noise index of the photodetector, R is the amplitude reflectance of the recording medium and $|r_i|^2$ is the intensity reflectance of the polarizing beam splitter for the light beam in said predetermined direction of polarization.

13. A system according to claim 12, wherein intensity reflectance $|r_i|^2$ and the multiplication noise index X are in the relation of $$|r_i|^2 = X/(2+3x).$$

* * * * *

UNITED STATES PATENT AND TRADEMARK OFFICE
CERTIFICATE OF CORRECTION

PATENT NO. : 4,558,440
DATED : December 10, 1985
INVENTOR(S) : YASUO TOMITA

It is certified that error appears in the above-identified patent and that said Letters Patent is hereby corrected as shown below:

Col. 3, line 5, change "nature that" to --nature such that--.
Col. 4, line 54, change "plank's" to --Planck's--.
Col. 5, line 6, change "fluction" to --fluctuation--.
Col. 7, line 19, change "represent" to --represents--.
Col. 9, line 35, change " Da=A a" to -- Da=A a--.
Col. 9, line 37, change " Db=A bT ' to -- Db= Ab T '--.
Col. 11, line 15-16 change "has/multiplication" to --has a multiplication--.
Col. 12, line 16, change "Plank's" to --Planck's--.
Col. 13, line 13, change "Plank's" to --Planck's--.
Col. 13, line 26, change "the beam" to --the light beam--.
Col. 14, line 49, change "Plank's" to --Planck's--.
Col. 15, line 9, change "Plank's" to --Planck's--.

Signed and Sealed this

Fourth Day of November, 1986

[SEAL]

*Attest:*

DONALD J. QUIGG

*Attesting Officer*   *Commissioner of Patents and Trademarks*